United States Patent
Mizukoshi

[19]

[11] Patent Number: 5,878,973
[45] Date of Patent: Mar. 9, 1999

[54] TOOL FOR PEELING TURNTABLE POLISHING CLOTH

[75] Inventor: Yukio Mizukoshi, Kanagawa-ken, Japan

[73] Assignee: Ebara Corporation, Tokyo, Japan

[21] Appl. No.: 18,911

[22] Filed: Feb. 5, 1998

[30] Foreign Application Priority Data

Feb. 5, 1997 [JP] Japan .................................. 9-038453

[51] Int. Cl.$^6$ .............................................. H01L 21/304
[52] U.S. Cl. ........................................ 242/532.5; 438/692
[58] Field of Search .................... 242/532.5; 438/692; 216/89, 91; 451/444, 458

[56] References Cited

U.S. PATENT DOCUMENTS

| | | | |
|---|---|---|---|
| 3,593,938 | 7/1971 | Watt ...................................... | 242/532.5 |
| 4,605,179 | 8/1986 | Arbter .................................. | 242/532.5 |
| 5,234,867 | 8/1993 | Schultz et al. ......................... | 438/692 |
| 5,245,796 | 9/1993 | Miller et al. ........................... | 438/692 |
| 5,310,455 | 5/1994 | Pasch et al. ........................... | 438/692 |
| 5,439,551 | 8/1995 | Meikle et al. ......................... | 438/692 |
| 5,645,682 | 7/1997 | Skrovan ................................ | 438/692 |
| 5,665,656 | 9/1997 | Jairath .................................. | 438/692 |
| 5,679,212 | 10/1997 | Kato et al. ............................. | 438/692 |
| 5,705,435 | 1/1998 | Chen .................................... | 438/692 |
| 5,720,845 | 2/1998 | Liu ....................................... | 438/692 |
| 5,736,427 | 4/1998 | Henderson ............................ | 438/692 |
| 5,736,462 | 4/1998 | Takahashi et al. ..................... | 438/692 |
| 5,759,918 | 6/1998 | Hoshizaki et al. .................... | 438/692 |

*Primary Examiner*—John P. Darling
*Attorney, Agent, or Firm*—Wenderoth, Lind & Ponack, L.L.P.

[57] ABSTRACT

A peeling tool for peeling a polishing cloth from a turntable includes a cloth pinching member for pinching a polishing cloth, and a cylindrical take-up cylinder having a cloth insertion slit formed in its outer peripheral surface. Cloth pinching portions of the cloth pinching member are protruded as tongues. Tip ends of upper and lower cloth pinching portions are shifted from each other in a protruded direction. The cloth pinching member is provided with a viewing hole through which the polishing cloth can be observed. The cloth pinching member having the pinching portions pinching the polishing cloth is contained within the take-up cylinder, and the polishing cloth is peeled from the turntable by rotating the take-up cylinder by a ratchet.

4 Claims, 7 Drawing Sheets

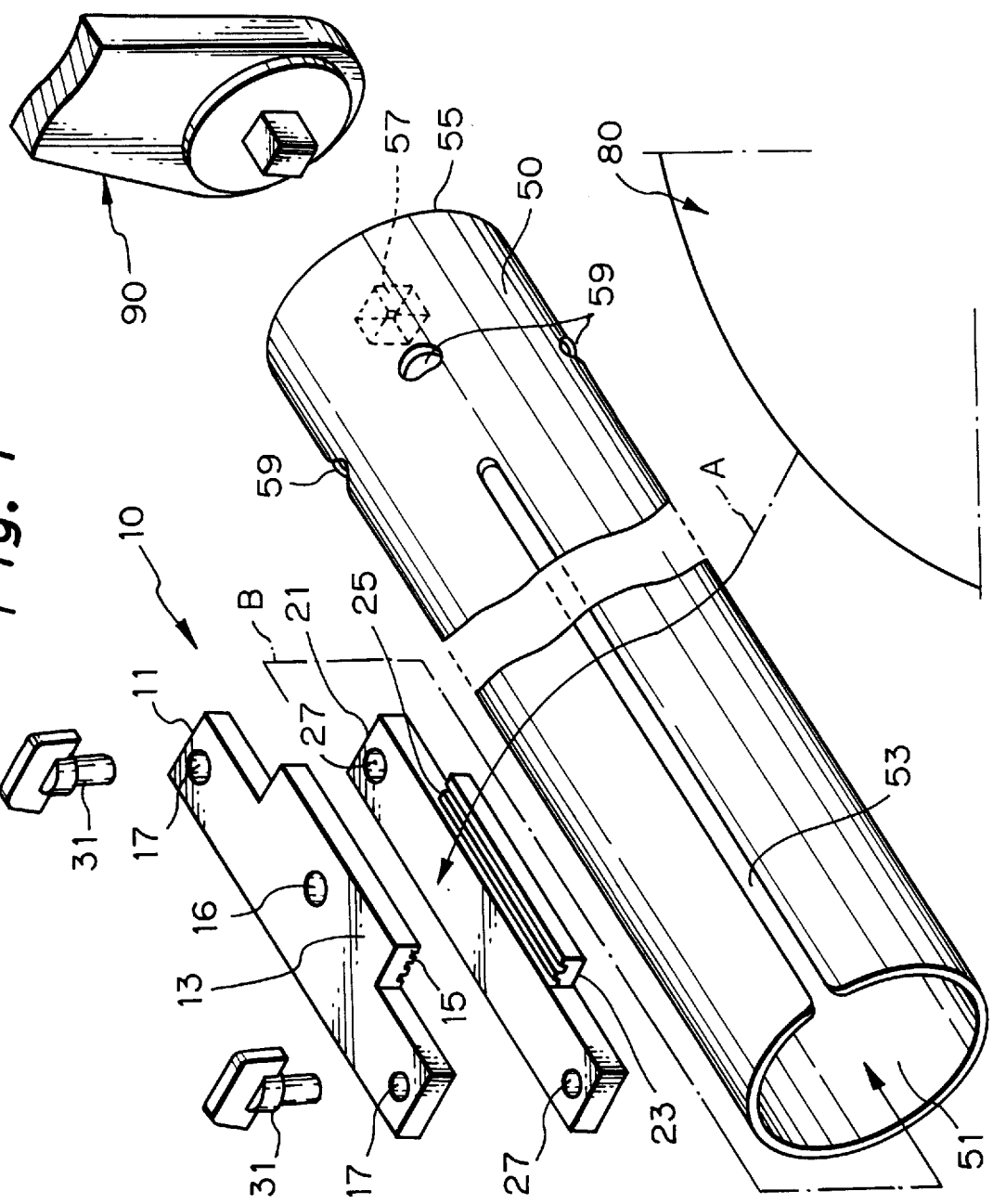

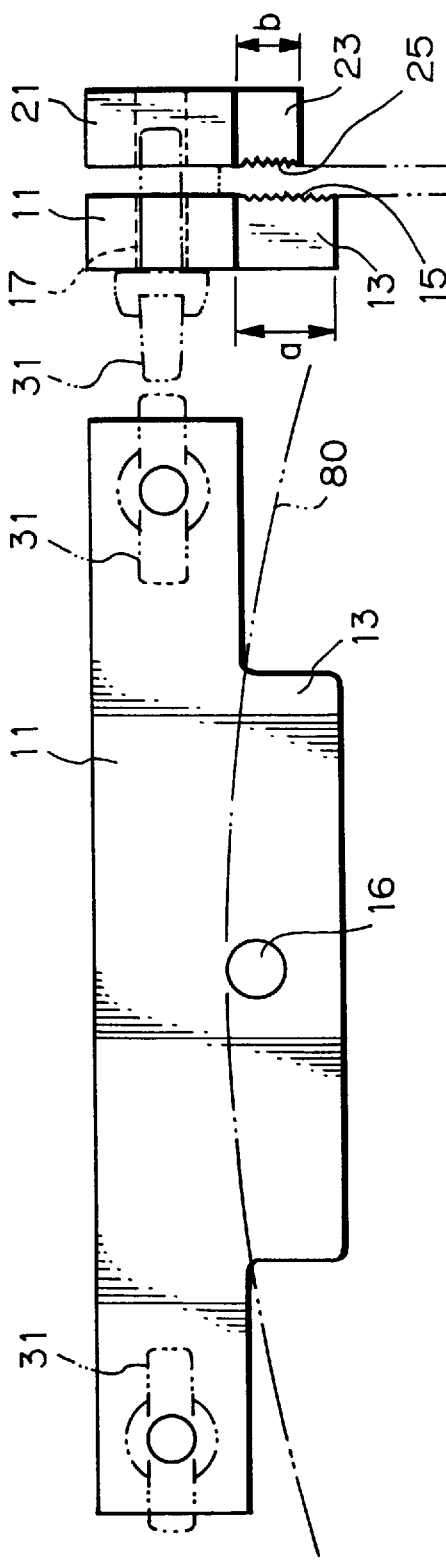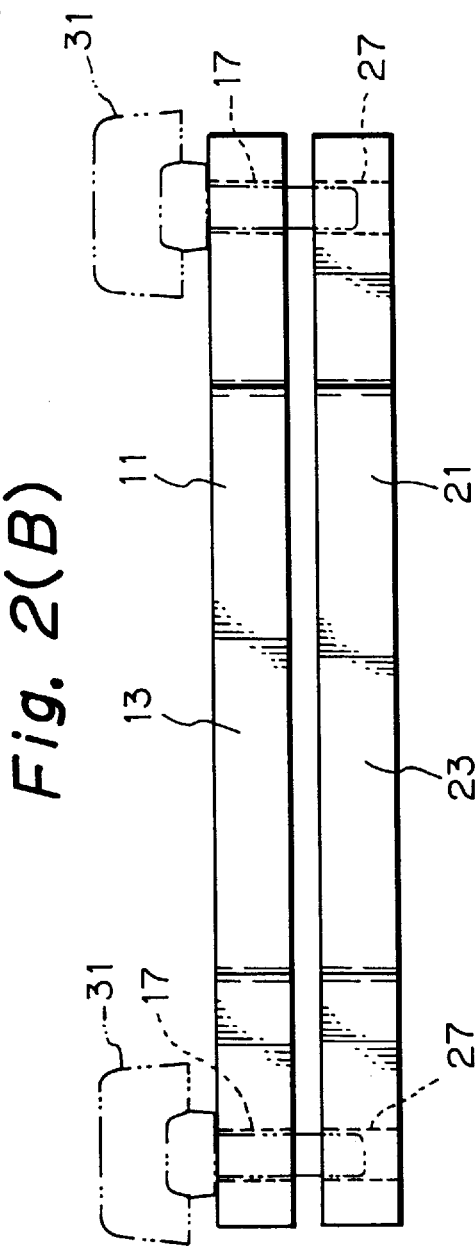

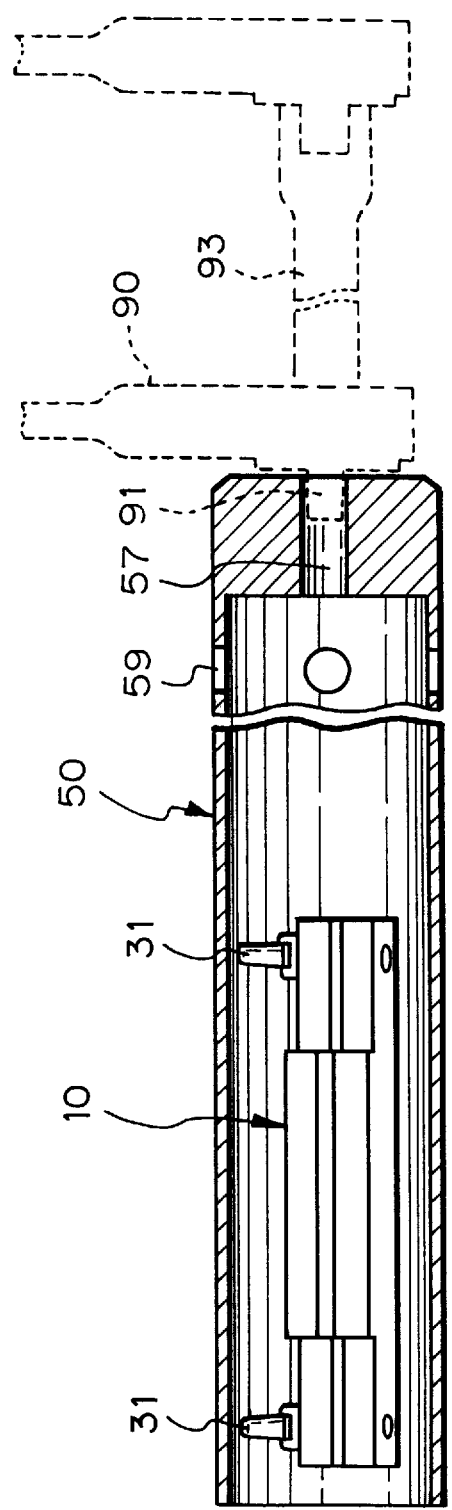
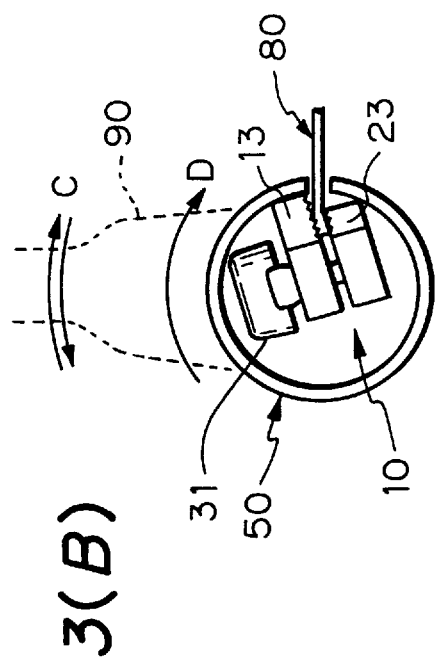
Fig. 3(A)
Fig. 3(B)

TOOL FOR PEELING TURNTABLE POLISHING CLOTH

BACKGROUND OF THE INVENTION

The present invention relates to a tool for peeling a turntable polishing cloth used to peel a polishing cloth adhered to a turntable of a polishing apparatus.

In the manufacture of semi-conductor wafers, a polishing apparatus has been used for polishing semiconductor wafers so as to enable a surface of a semiconductor wafer to be made flat with a mirror-surface finish.

FIG. 8 is a schematic sectional view of the polishing apparatus 100. As shown in FIG. 8, such a polishing apparatus comprises a turntable 95 and top ring 213 which are rotated respective numbers of rotations, and a surface of a semiconductor wafer 220 held by the top ring 213 is contacted with a surface (polishing surface) of a polishing cloth 80 adhered to the turntable and polished while abrasive liquid from an abrasive liquid supply source.

In more detail, a top ring head 210 is disposed above the turntable 95 and includes the top ring 213 for pressing the semiconductor wafer 220 against the turntable 95 while holding the semiconductor wafer. The turntable 95 is connected to a motor (not shown) to be rotated around an axis 96 in a direction shown by the arrow R. The polishing cloth 80 is adhered to a top surface of the turntable 95.

The top ring 213 is connected to a motor and a lift/lower cylinder (not shown). With this arrangement, the top ring 213 can be lifted and lowered as shown by the arrow S and can be rotated around its axis as shown by the arrow T so that the semiconductor wafer 220 can be pressed against the polishing cloth 80 with any pressure. The semiconductor wafer 220 can be sucked to a lower surface of the top ring 213 by vacuum or the like. A guide ring 216 is attached to a lower peripheral portion of the top ring 213 to prevent disengagement of the semiconductor wafer 220 from the top ring.

An abrasive liquid supplying nozzle 215 is disposed above the turntable 95 so that polishing abrasive liquid can be supplied from the abrasive liquid supplying nozzle 215 to the polishing cloth 80 adhered to the turntable 95.

A dressing head 211 includes a dressing member 218. The dressing member 218 is diametrically opposed to the top ring 213 above the polishing cloth 80 so that dressing of the polishing cloth 80 can be effected. A water supplying nozzle 221 can supply a dressing liquid (for example, water) to the polishing cloth 80 on the turntable 95. The dressing member 218 is connected to a lift/lower cylinder and a rotating motor so that the dressing member can be lifted and lowered as shown by the arrow U and can be rotated around its axis as shown by the arrow V.

The dressing member 218 is constituted by a disc having a diameter substantially same as that of the top ring 213 and is provided at its lower surface with a dressing tool 219. The abrasive liquid supplying nozzle 215 and the water supplying nozzle 221 extend up to the vicinity of a rotational center of the turntable to supply the abrasive liquid and the water to predetermined positions on the polishing cloth 80, respectively.

By pressing the semiconductor wafer 220 held by the top ring 213 against the polishing cloth 80 and by rotating the turntable 95 and the top ring 213, the lower surface (to be polished) of the semiconductor wafer 220 is rubbed against the polishing cloth 80. At the same time, by supplying the abrasive liquid onto the polishing cloth 80 from the abrasive liquid supplying nozzle 215, the polished surface of the semiconductor wafer 220 is polished by the combination of the mechanical polishing action of the abrasive particles in the abrasive liquid and the chemical polishing action of alkali (liquid component) in the abrasive liquid.

When the semiconductor wafer 220 is polished by a predetermined amount, the polishing operation is finished. At this point, since the polishing cloth is worn by the polishing action, thus causing a deterioration in polishing ability, dressing of the polishing cloth is effected.

That is to say, in a condition that the dressing member 218 holding the dressing tool 219 and the turntable 95 are rotated, the dressing tool 219 is pressed against the polishing cloth 80 with predetermined pressure. In this case, the water is supplied onto the polishing cloth 80 from the water supplying nozzle 221. By supplying the water, the waste abrasive liquid remaining on the polishing cloth 80 is washed out, thereby refreshing the polishing cloth.

When the semiconductor wafer is polished by the polishing cloth, since the polishing cloth must not be peeled from the turntable, the polishing cloth is firmly adhered to the turntable. Thus, when the worn polishing cloth is changed to a new polishing cloth, a strong force is required for peeling the worn polishing cloth.

In the conventional technique, in order to peel the polishing cloth, as shown in FIG. 5, the operator enters into the polishing apparatus 100 by the upper half of his body, and, a part of a peripheral edge of the polishing cloth 80 is caused to be slightly peeled from the turntable 95 and the polishing cloth 80 is pulled forwardly (toward the operator) while pinching the peeled part of the polishing cloth by means of pincers or a pliers 110.

However, in this peeling method, not only is a strong force required to peel the polishing cloth, but also, if the pincers or pliers 110 are disengaged from the polishing cloth 80 during the peeling operation, the operator may be injured by being struck against the ceiling or any internal structure of the polishing apparatus 100.

In order to avoid such inconvenience, as shown in FIG. 6, there has been proposed a polishing cloth peeling tool comprising a cloth pinching member 120 for pinching the polishing cloth, a cylindrical cloth take-up cylinder 130 having a cloth insertion slit 131 at its peripheral portion, and a ratchet 140 for rotating the cloth take-up cylinder 130 in one direction.

In use, first of all, a part of a peripheral edge of a circular cloth 150 adhered to a turntable is peeled from the turntable, and then the peeled part of the polishing cloth is pinched between an upper member 121 and a lower member 123 of the cloth pinching member 120 and the members 121, 123 are secured together by screws 125. In this case, since three pins 127 are penetrated into the polishing cloth 150 and are inserted into corresponding pin insertion holes 128, the polishing cloth 150 cannot be disengaged from the cloth pinching member 120.

Then, the cloth pinching member 120 is inserted into the cloth take-up cylinder 130 while inserting the pinched polishing cloth 150 into the cloth insertion slit 131.

Then an engagement portion 141 of the ratchet 140 is engaged by a tool engagement portion 133 of the take-up cylinder 130. In this condition, when the ratchet 140 is rotated, the take-up cylinder 130 is rotated in one direction (shown by the arrow H), with the result that the cloth 150 is wound around the take-up cylinder 130.

In this peeling tool, the polishing cloth 150 can be peeled from the turntable easily and positively with a relatively weak force.

However, this peeling tool has the following disadvantages.

(1) If a length of the cloth pinching member 120 is reduced to make the peeling tool compact, as shown in FIG. 7A, since the polishing cloth 150 abuts against the upper and lower screws 125, the polishing cloth 150 cannot be inserted into the cloth pinching member 120 adequately, with the result that the polishing cloth is not pinched by the cloth pinching member completely. Particularly when the cloth pinching member 120 has the pins 127, the polishing cloth 150 does not reach the pins 127.

To avoid such an inconvenience, as shown in FIG. 7B, a tongue 151 is provided at the periphery of the polishing cloth 150 to be pinched by the cloth pinching member 120. In this case, however, the tongue 151 must be provided at the periphery of the polishing cloth 150, with the result that operability is worsened.

(2) It cannot be judged immediately what amount of the polishing cloth 150 pinched by the cloth pinching member 120 is inserted into the cloth pinching member 120, i.e., whether or not the polishing cloth 150 is pinched by the cloth pinching member 120 sufficiently.

(3) In the case where the diameter of the take-up cylinder 130 is reduced to make the peeling tool compact, when the cloth pinching member 120 pinching the cloth 150 is inserted into the take-up cylinder 130, as shown in FIG. 7C, there is a danger of damaging heads of the securing screws 125 by abutting the heads against the inner surface of the cylinder 130. This is true particularly when the securing screws 125 have heads of higher height such as butterfly screws.

SUMMARY OF THE INVENTION

The present invention aims to eliminate the above-mentioned conventional drawbacks, and an object of the present invention is to provide a peeling tool for peeling a turntable polishing cloth, in which polishing cloth can be positively pinched even when the peeling tool is made compact, it can be judged immediately whether or not the polishing cloth is pinched sufficiently, and there is no danger of damaging heads of securing screws by abutting the heads against an inner surface of a take-up cylinder.

To achieve the above object, according to one aspect of the present invention, there is provided a peeling tool for peeling a polishing cloth adhered to a turntable, comprising a cloth pinching member for pinching the polishing cloth, the cloth pinching member being contained in a cylindrical take-up cylinder having a cloth insertion slit formed in its outer peripheral surface and the cloth pinching member having a tongue portion for pinching the polishing cloth.

According to another aspect of the present invention, there is provided a peeling tool for peeling a polishing cloth adhered to a turntable, comprising a cloth pinching member for pinching the polishing cloth, the cloth pinching member being contained in a cylindrical take-up cylinder having a cloth insertion slit formed in its outer peripheral surface and the cloth pinching member having an opening or openings through which the polishing cloth can be seen.

According to a further aspect of the present invention, there is provided a peeling tool for peeling a polishing cloth adhered to a turntable, comprising a cloth pinching member for pinching the cloth from both upper and lower sides, the cloth pinching member being contained in a cylindrical take-up cylinder having a cloth insertion slit formed in its outer peripheral surface and the cloth pinching member including upper and lower cloth pinching members having upper and lower tip ends shifted from each other.

BRIEF DESCRIPTION OF THE DRAWINGS

FIG. 1 is a perspective view of a peeling tool for peeling a turntable polishing cloth according to a preferred embodiment of the present invention.

FIG. 2A is a plan view of a cloth pinching member, FIG. 2B is a front view of the cloth pinching member, and FIG. 2C is a side view of the cloth pinching member.

FIG. 3A is a schematic sectional view for explaining a method for using the peeling tool and FIG. 3B is a schematic side view for explaining such a method.

DETAILED DESCRIPTION OF THE PREFERRED EMBODIMENTS

Figure 4:
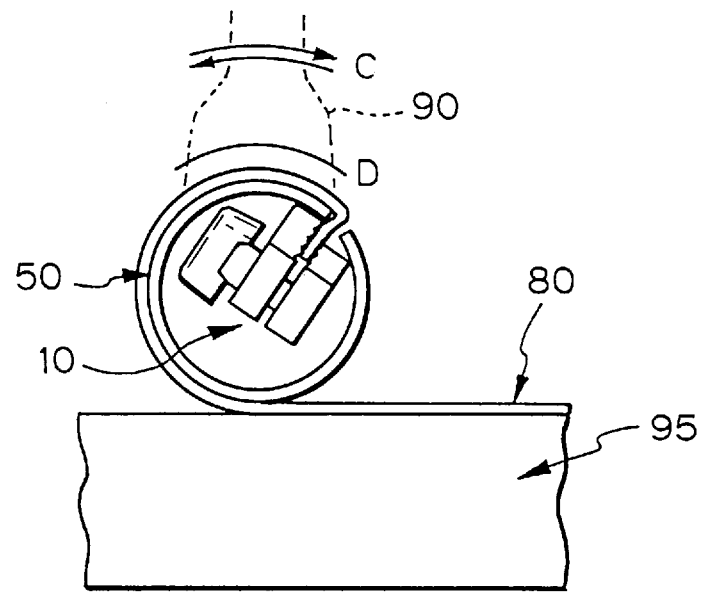
FIG. 4 is a schematic side view for explaining a method for using the peeling tool.
Figure 5:
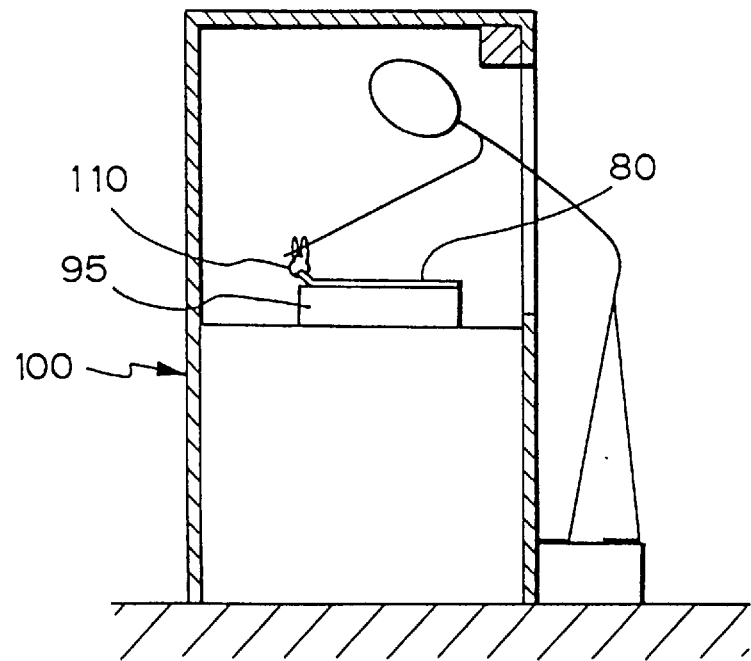
FIG. 5 is a schematic view for explaining a conventional method for peeling a polishing cloth 80.

The present invention will now be explained in connection with an embodiment thereof with reference to the accompanying drawings.

FIG. 1 is a perspective view of a peeling tool for peeling a turntable polishing cloth according to a preferred embodiment of the present invention. As shown in FIG. 1, the peeling tool is constituted by a cloth pinching member 10 and a take-up cylinder 50. Now, these elements will be described in detail.

FIG. 2A is a plan view of the cloth pinching member 10, FIG. 2B is a front view of the cloth pinching member, and FIG. 2C is a side view of the cloth pinching member. As shown in FIGS. 1 and 2C, the cloth pinching member 10 comprises an upper metallic member 11, a lower metallic member 21, and two securing screws 31 for securing the upper and lower members 11, 21 together.

The upper member 11 is constituted by a flat plate provided at opposite end portions with through holes 17 through which securing screws 31 can be inserted. Further, the upper member 11 has a tongue-shaped pinching portion 13 projecting from a central portion of one lateral edge of the flat plate. A pinching surface 15 having a plurality of parallel grooves is formed on a lower surface of the pinching portion 13. Further, a viewing through hole 16 is formed in a central portion of the pinching portion 13.

The lower member 21 is constituted by a flat plate provided at oppoisite end portions with threaded holes 27 into which the securing screws 31 can be threaded. Further, the lower member 21 has a tongue-shaped pinching portion 23 projecting from a central portion of one lateral edge of the flat plate. A pinching surface 25 having a plurality of parallel grooves is formed on an upper surface of the pinching portion 23.

As shown in FIG. 2C, a projected amount a of the pinching portion 13 of the upper member 11 is greater than a projected amount b of the pinching portion 23 of the lower member 21 by a predetermined value. That is to say, a tip end of the pinching portion 13 is shifted from a tip end of the pinching portion 23 in a projected direction. The securing screws 31 are so-called butterfly screws which can be rotated manually.

The take-up cylinder 50 shown in FIG. 1 is constituted by a cylindrical metallic member defining an internal space acting as a containing portion 51 having an inner diameter capable of containing the cloth pinching member 10. An elongated cloth insertion slit 53 extending from an open end of the take-up cylinder in a longitudinal direction is formed in an outer peripheral surface of the take-up cylinder. A rectangular tool engagement portion 57 is formed in a central portion of a closed end 55 of the take-up cylinder.

A second tool engagement portion 59 comprised of four circular through holes (only three are shown) equidistantly disposed along a circumferential direction is formed on the outer peripheral surface of the take-up cylinder near the closed end 55 thereof.

Now, a method for using the peeling tool will be described. First of all, a portion of the periphery of the circular polishing cloth 80 (FIG. 1) adhered to the turntable is slightly peeled, and the peeled portion of the polishing cloth is pinched between the pinching surfaces 15, 25 of the pinching portions 13, 23 of the upper and lower members 11, 21 of the cloth pinching member 10 (arrow A). Then, the securing screws 31 are inserted into the through holes 17 and threaded into the threaded holes 27, thereby firmly pinching the polishing cloth 80 between the pinching surfaces 15, 25.

In this case, since the pinching portions 13, 23 are protruded toward the polishing cloth 80 from portions at which the securing screws 31 are mounted, even if the longitudinal dimension of the cloth pinching member 10 is reduced, as shown in FIG. 2A, there is no danger of the polishing cloth 80 not being sufficiently inserted between the pinching portions 13 and 23 as a result of the polishing cloth 80 abutting against the securing screws 31. Thus, the polishing cloth can positively be pinched between the pinching portions.

Further, as shown in FIG. 2A, since the polishing cloth pinched between the pinching portions can be observed through the viewing hole 16 formed in the upper member 11, it can be judged immediately what amount of the polishing cloth 80 is inserted into the cloth pinching member 10.

Returning to FIG. 1, the cloth pinching member 10 pinching the polishing cloth 80 is then inserted into the containing portion 51 of the take-up cylinder 50 (arrow B). In this case, the polishing cloth is inserted into the cloth insertion slit 53. The operation in which the polishing cloth 80 is secured to the cloth pinching member 10 and the cloth pinching member 10 is set within the take-up cylinder 50 can be performed regarding a polishing cloth portion near the operator or a polishing cloth portion remote from the operator. However, in view of operability, such an operation may be performed regarding the polishing cloth portion near the operator.

FIGS. 3A and 3B show the condition that the cloth pinching member 10 with the cloth 80 is inserted into the take-up cylinder 50. Incidentally, FIG. 3A is a schematic sectional view and FIG. 3B is a schematic side view. As shown in FIGS. 3A and 3B, the polishing cloth 80 is pinched by and secured to the cloth pinching member 10 with the peripheral portion of the polishing cloth inserted within the take-up cylinder 50.

In this case, as shown in FIG. 3B, according to the present invention, since the tip end of the pinching portion 13 is protruded more than the tip end of the pinching portion 23 to shift from each other in the projected direction, when the tip ends of the pinching portions 13, 23 abut against the inner peripheral surface of the take-up cylinder 50, the entire cloth pinching member 10 is inclined so that the heads of the securing screws 31 are lowered. Therefore, the heads of the securing screws 31 do not abut against the inner peripheral surface of the take-up cylinder 50.

Then, the engagement portion 91 of the ratchet 90 is inserted into the tool engagement portion 57 of the take-up cylinder 50. When the ratchet 90 is reciprocally rocked (arrows C) as shown in FIG. 4, the take-up cylinder is rotated in one direction (arrow D) to wind the polishing cloth 80 around the take-up cylinder 50 gradually. This operation can be effected easily and positively with a weak force due to "the lever principle". Accordingly, unlike to the above-mentioned conventional technique, it is not apprehended that the head of the operator is struck against the ceiling of the polishing apparatus if the pincers or pliers 110 are disengaged from the cloth during the peeling operation. Incidentally, when the operator peels the polishing cloth 80 by using the peeling tool from a front side (near the operator) to a rear side (remote from the operator), there is less possibility of striking the head of the operator against the polishing apparatus.

When a width (dimension in a longitudinal direction of the take-up cylinder 50) of the polishing cloth 80 is increased, as shown in FIG. 3A, the engagement portion 91 of the ratchet 90 is once disengaged from the tool engagement portion 57, and an intermediate rod 93 is engaged by the tool engagement portion 57 and the engagement portion 91 of the ratchet 90 is engaged by the other end of the intermediate rod. In this condition, the take-up cylinder 50 is rotated again. When the width of the polishing cloth 80 is further increased, another intermediate rod 93 may be added.

Incidentally, when the take-up cylinder 50 is rotated without using the ratchet 90, a rod may be inserted into the second tool engagement portion 59 of the take-up cylinder 50 and then the take-up cylinder may be rotated by turning the rod. It should be noted that means for rotating the take-up cylinder is not limited to the above-mentioned arrangements.

While the present invention was fully explained with respect to the specific embodiment, the present invention is not limited to such an embodiment, but, various alternations can be effected, for example, as follows:

(1) In the above-mentioned embodiment, while an example that the cloth pinching member is formed independently from the take-up cylinder was explained, the cloth pinching member may be formed integrally with the take-up cylinder. That is to say, for example, two adjacent tongues may be protruded from the inner surface of the take-up cylinder and the end portion of the polishing cloth inserted into the cloth insertion slit may be pinched between these tongues and thereafter the tongues may be secured to each other by screws and the like.

Figure 6:
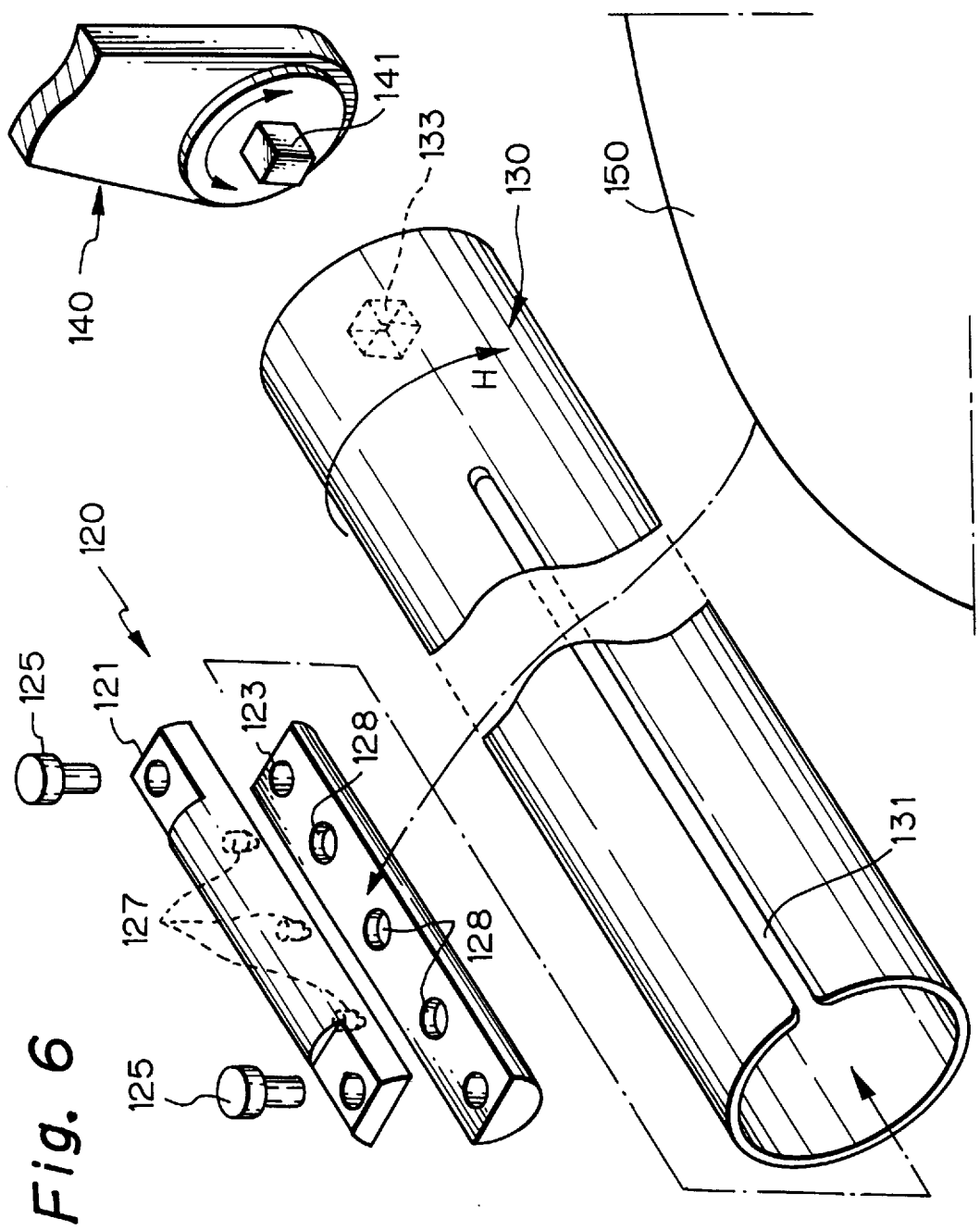
FIG. 6 is a perspective view of a peeling tool proposed by the Inventors.
Figure 7A:
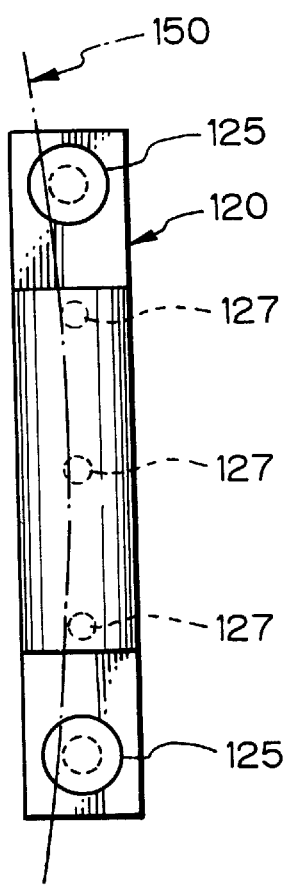
FIGS. 7A to 7C are views showing problems caused by the tool shown in FIG. 6.
Figure 7B:
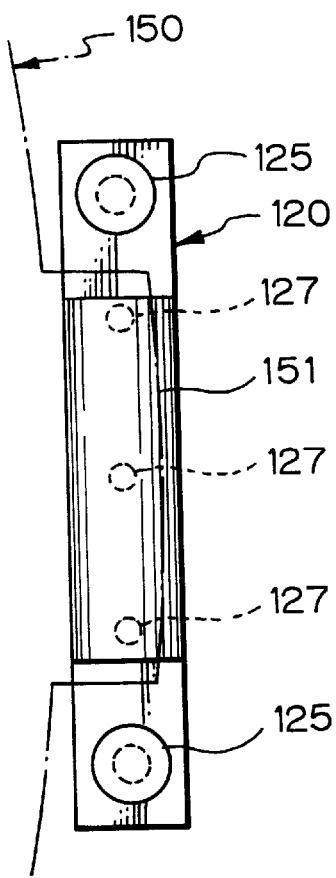
Figure 7C:
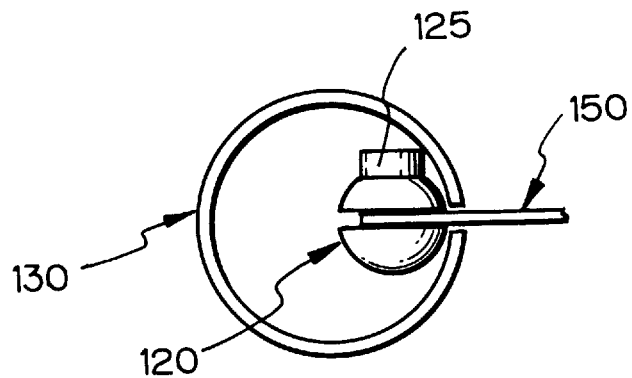
Figure 8:
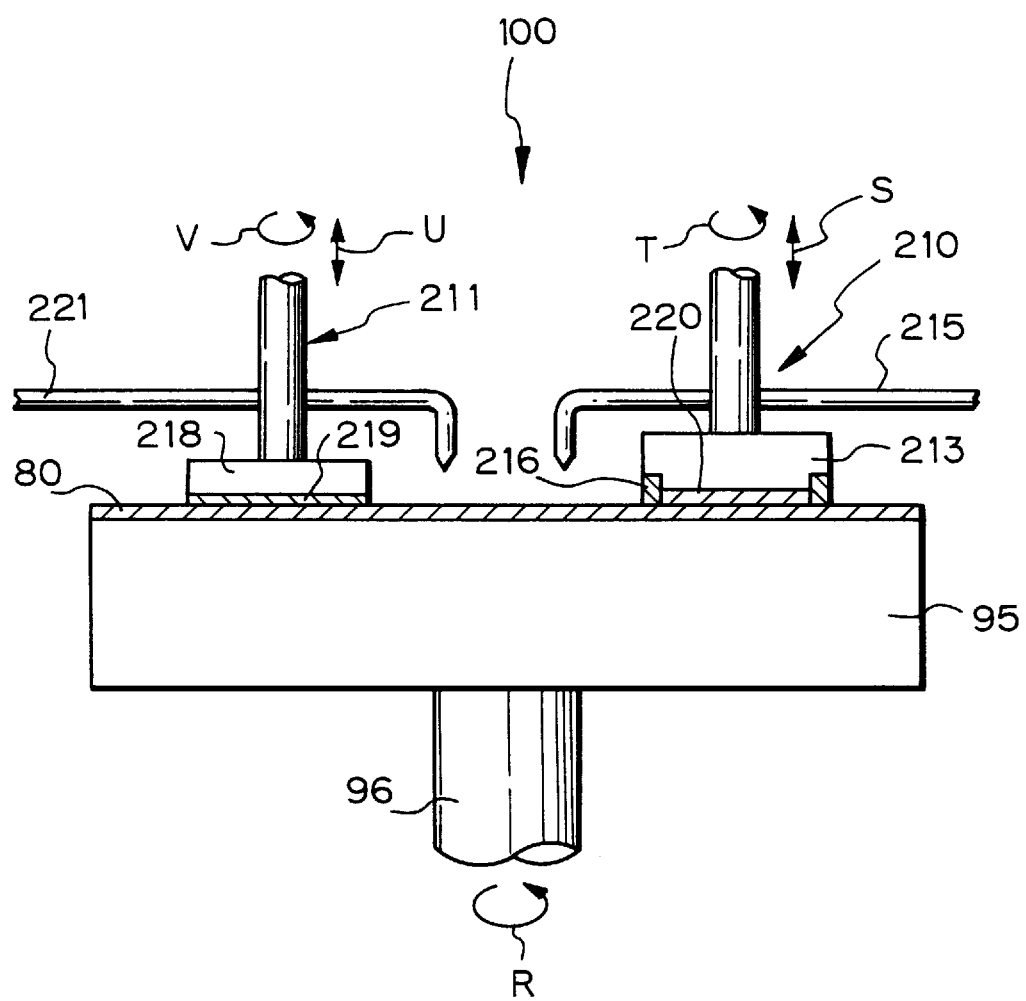
FIG. 8 is a schematic sectional view of a polishing apparatus.

(2) In the above-mentioned embodiment, while an example that the upper and lower members 11, 21 are provided with the pinching portions 13, 23 having the pinching surfaces 15, 25 comprised of the plurality of parallel grooves was explained, alternatively, as shown in FIG. 6, the upper member may be provided with pins 127 and the lower member may be provided with corresponding pin insertion holes 128. Alternatively, other pinching surfaces may be used (for example, high friction members may be adhered to the pinching surfaces). In some cases, the plurality of parallel grooves and the pins/holes may be omitted.

(3) In the above-mentioned embodiment, while an example that the cloth pinching member 10 and the take-up cylinder 50 are formed from metal was explained, these elements may be formed from materials other than metal.

(4) In the above-mentioned embodiment, while an example that the securing screws 31 are butterfly screws was explained, other screws may be used as the securing screws. Further, the upper and lower members 11, 21 may be secured together by other means such as bolts/nuts, in place of the securing screws. If one pair of adjacent ends of the upper and lower members 11, 21 are interconnected by a hinge structure, a single securing screw may be used to secure the other ends of the members together.

As mentioned above, according to the present invention, the following advantages can be obtained:

(1) Since the pinching portions of the cloth pinching member are protruded as tongues, even when the longitudinal dimension of the cloth pinching member is reduced, the polishing cloth can be positively pinched by the cloth pinching member.

(2) Since the viewing hole for observing the polishing cloth is formed in the cloth pinching member, the pinched polishing cloth can be observed through the viewing hole, and, thus, it can be judged immediately whether the polishing cloth is sufficiently pinched by the cloth pinching member.

(3) Since the tip ends of the upper and lower members of the cloth pinching member are shifted from each other in the protruded direction, the heads of the securing screws attached to the cloth pinching member do not abut against the inner surface of the take-up cylinder, and, thus, there is no danger of damaging the heads of the securing screws and the inner surface of the take-up cylinder.

What is claimed is:

1. A peeling tool for peeling a polishing cloth adhered to a turntable of a polishing apparatus, wherein:

said peeling tool is constituted by containing a cloth pinching member for pinching the polishing cloth within a cylindrical take-up cylinder having a cloth insertion slit formed in its outer peripheral surface, and said cloth pinching member has protruded tongue portions for pinching the polishing cloth.

2. A peeling tool according to claim 1, wherein each of said protruded portions is tongue-shaped.

3. A peeling tool for peeling a polishing cloth adhered to a turntable of a polishing apparatus, wherein:

said peeling tool is constituted by containing a cloth pinching member for pinching the polishing cloth within a cylindrical take-up cylinder having a cloth insertion slit formed in its outer peripheral surface, and said cloth pinching member has at least a hole through which the polishing cloth can be seen.

4. A peeling tool for peeling a polishing cloth adhered to a turntable of a polishing apparatus, wherein:

said peeling tool is constituted by containing a cloth pinching member for pinching the polishing cloth from both upper and lower sides within a cylindrical take-up cylinder having a cloth insertion slit formed in its outer peripheral surface, and the cloth pinching member including upper and lower cloth pinching portions having upper and lower tip ends shifted from each other.

\* \* \* \* \*